Patented Apr. 12, 1927.

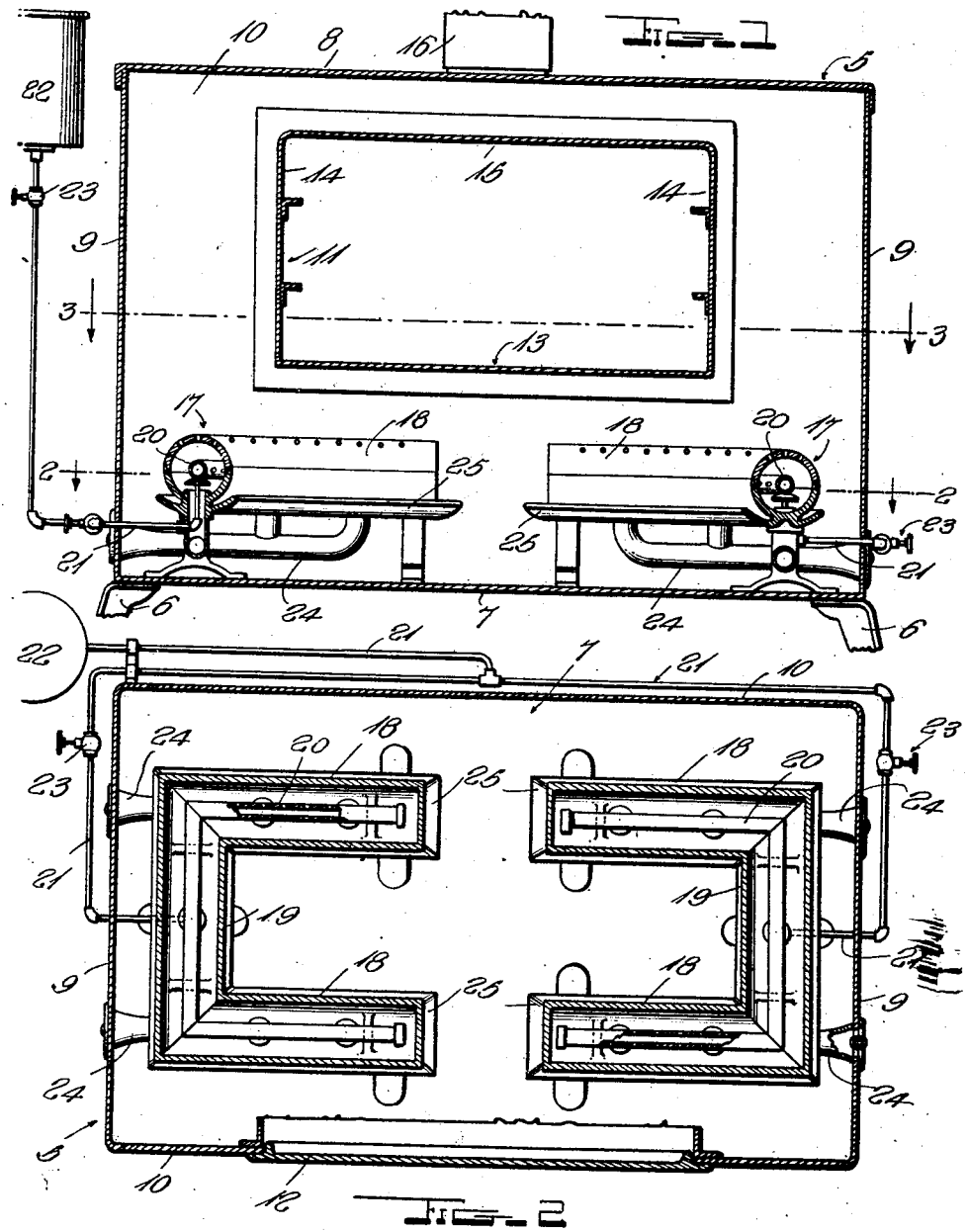

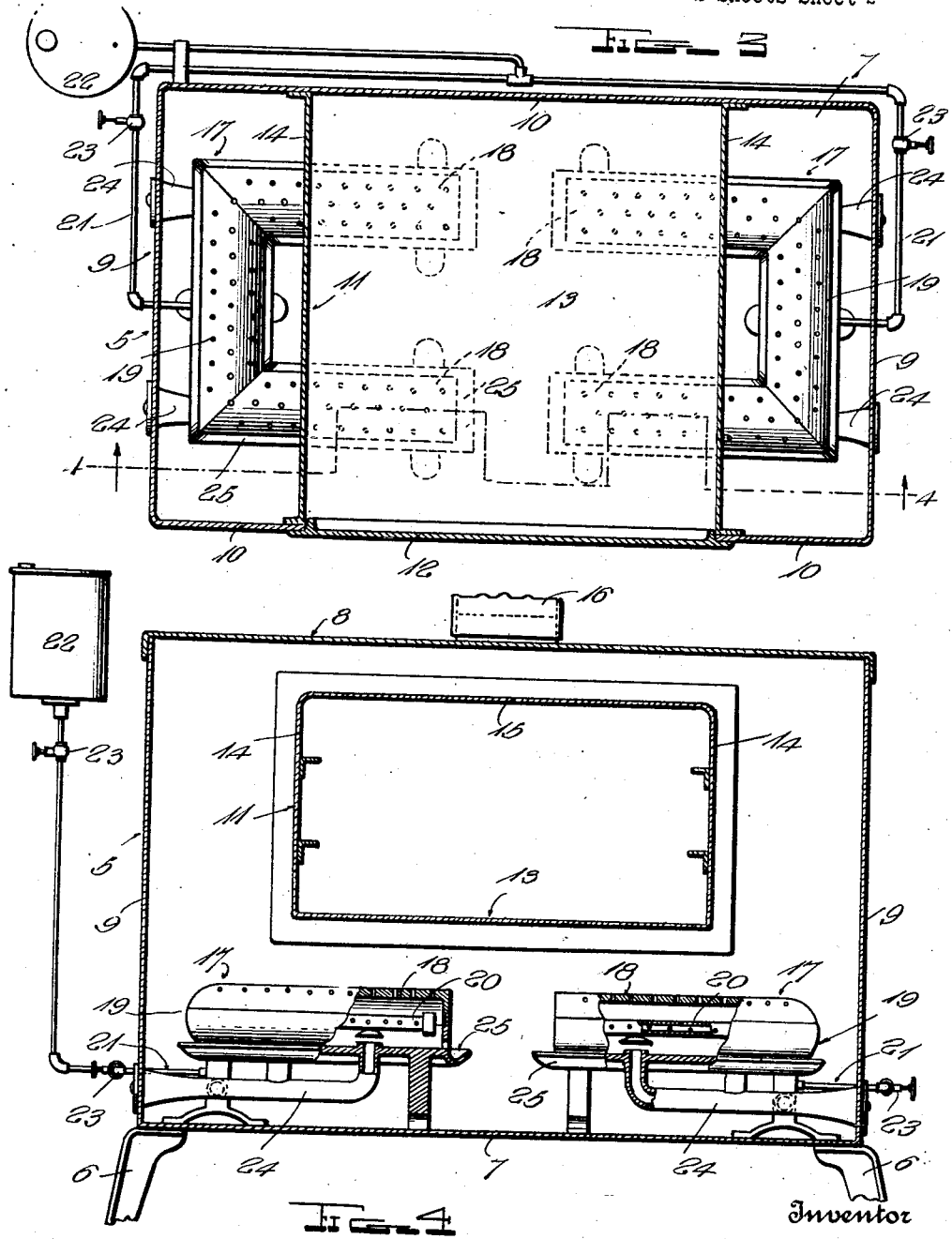

1,624,298

UNITED STATES PATENT OFFICE.

OSCAR WHITE, OF ST. LOUIS, MISSOURI.

STOVE.

Application filed May 4, 1926. Serial No. 106,760.

The invention relates to improvements in cooking and baking stoves in which an inner casing forming a baking chamber is spaced from the bottom and top and opposed side walls of an outer casing, and it is the object of the invention to provide heating units related in a novel manner with the inner and outer casing so that by merely using two of such units, the baking compartment may be effectively heated and the top of the outer casing also highly heated for cooking purposes.

With the foregoing in view, the invention resides in the novel subject matter hereinafter described and claimed, the description being supplemented by the accompanying drawings.

Figure 1 is a vertical longitudinal section through an oven constructed in accordance with my invention.

Figure 2 is a horizontal sectional view on line 2—2 of Fig. 1.

Figure 3 is an additional horizontal section on the plane of line 3—3 of Fig. 1.

Figure 4 is a longitudinal sectional view substantially on the irregular line 4—4 of Fig. 3.

In the drawings above briefly described which illustrate the general form of construction which is preferably employed, the numeral 5 designates an outer casing preferably formed from metal and supported by appropriate legs 6. This casing includes a bottom 7, a top 8, one pair of opposed side or end walls 9, and another pair of opposed side walls 10.

Within the outer casing 5 is an inner casing 11 whose back wall is preferably formed by a portion of one of the walls 10, while its front is formed by a door 12. The bottom 13 of this inner casing is spaced a considerable distance above the bottom 7, the opposed side or end walls 14 thereof are inwardly spaced from the corresponding walls 9 of the outer casing 5, and the top 15 is downwardly spaced from the top 8, so that passage of heat may take place entirely around the inner casing, said heat then escaping through an appropriate vent 16 from the upper portion of the casing 5.

Suitably mounted within lower corner portions of the outer casing 5, are two burners 17 whose detailed construction forms no part of the present invention but is protected by my companion U. S. application, Serial No. 106,759, filed May 4, 1926. The general form of the burners however, is important in the present application. These burners are each of U-shape in plan view, with their arms 18 extending under the inner casing 11, while their arm-connecting portions 19 are disposed under the spaces between the walls 9 and 14. By using burners of this form in connection with the relation of casings as above set forth, it is insured that an abundance of heat shall be applied not only directly to the bottom 13 of the casing 11, but at opposite portions of said casing, that is between the walls 9 and 14, and it will also be seen that all heat ascending through these spaces must turn inwardly over the top 15 before it can escape through the vent 16. Thus, unusually efficient heating of the baking chamber is provided and quick and excellent results may be obtained.

While the details of burner construction, as above stated, form no part of the present invention, certain parts thereof may be briefly identified, for sake of clearness. The burner bodies are designated by the characters 18—19, and within these bodies are U-shaped perforated fuel pipes 20 to which fuel is supplied from pipe lines 21 leading from an appropriate tank 22 and provided wherever desired with valves 23. 24 designates the air intake manifolds for the hollow burner bodies, and 25 has reference to combined drip and pre-heating troughs.

While I prefer to make use of burners which form gas from liquid fuel and mix it with air, it will be understood that natural or artificial gas could be used as fuel with properly constructed burners, or that in some instances, electrical heating units might be substituted for the burners. Regardless of the exact type of heating unit employed, this unit will not only effectively heat the baking compartment to insure quick baking but will also heat the top of the outer casing so that the stove may well be used for cooking purposes also. This result, it will be observed, is attained without the use of additional burners disposed under the top of the outer casing.

I claim:

A combined cooking and baking stove comprising an outer casing having a top, a bottom, a back wall, opposed end walls and a front wall, said front wall being formed with a door, a vent from the upper portion of said casing, an inner casing within said outer casing and comprising a top spaced downwardly from the top thereof, a bottom spaced upwardly a relatively great distance from the bottom of the outer casing, and two opposed end walls inwardly spaced from said opposed walls of said outer casing, the back of said inner casing being formed by a portion of the back of said outer casing and the front of said inner casing being formed by the aforesaid door; and burners mounted in lower corner portions of the outer casing, said burners being of U-shape in plan view and having their arms extending under said inner casing, the arm-connecting portions of said burners being disposed longitudinally of and below the existing spaces between said opposed end walls of the inner and outer casings.

In testimony whereof I have hereunto affixed my signature.

OSCAR WHITE.